United States Patent
Mayhew et al.

(10) Patent No.: US 7,631,313 B2
(45) Date of Patent: Dec. 8, 2009

(54) SYSTEM AND METHOD FOR TRANSFERRING DATA

(76) Inventors: David Mayhew, 159 Pleasant St., North Borough, MA (US) 01532; Lynne Michelle Brocco, 209 Erie St. #1, Cambridge, MA (US) 02139

(*) Notice: Subject to any disclaimer, the term of this patent is extended or adjusted under 35 U.S.C. 154(b) by 499 days.

(21) Appl. No.: 10/464,027

(22) Filed: Jun. 17, 2003

(65) Prior Publication Data

US 2004/0015561 A1 Jan. 22, 2004

Related U.S. Application Data

(60) Provisional application No. 60/389,361, filed on Jun. 17, 2002.

(51) Int. Cl.
*G06F 9/54* (2006.01)
*G06F 13/38* (2006.01)

(52) U.S. Cl. ............ 719/313; 709/231
(58) Field of Classification Search ............ 719/313; 709/231
See application file for complete search history.

(56) References Cited

U.S. PATENT DOCUMENTS

| | | | | |
|---|---|---|---|---|
| 4,700,185 A * | 10/1987 | Balph et al. | | 370/451 |
| 5,287,455 A * | 2/1994 | Rosenthal | | 709/253 |
| 5,799,206 A * | 8/1998 | Kitagawa et al. | | 710/36 |
| 6,163,874 A * | 12/2000 | Bron | | 716/4 |
| 6,314,477 B1 * | 11/2001 | Cowger et al. | | 710/22 |
| 6,336,143 B1 * | 1/2002 | Diedrich et al. | | 709/231 |
| 6,470,340 B1 * | 10/2002 | Kawai et al. | | 707/10 |
| 6,598,096 B1 * | 7/2003 | Oi et al. | | 710/10 |
| 6,785,752 B2 * | 8/2004 | Gerhart | | 710/56 |
| 6,842,906 B1 * | 1/2005 | Bowman-Amuah | | 719/330 |
| 7,012,893 B2 * | 3/2006 | Bahadiroglu | | 370/231 |
| 2002/0085547 A1 * | 7/2002 | McNamara | | 370/386 |
| 2003/0158998 A1 * | 8/2003 | Smith | | 711/112 |
| 2003/0217232 A1 * | 11/2003 | Audityan et al. | | 711/141 |
| 2004/0221123 A1 * | 11/2004 | Lam et al. | | 711/202 |

OTHER PUBLICATIONS

Manfred Stolle, "The dmscp data transmission tool," Feb. 20, 2001.*
W. Richard Stevens (Pearson education, 1994, "TCP/IP Illustrated: the protocols" p. 275-296).*
Andre S. Tanenbaum, "Computer Networks Third edition"; 1996, by pentice Hall, Inc, Simon & Schuster Company.*

* cited by examiner

*Primary Examiner*—Van H Nguyen
*Assistant Examiner*—Abdou K Seye (57) ABSTRACT

A system and method for transferring data between two relatively autonomous processors using a sockets interface. In particular, a source SDT ("socket data transfer") engine tells a destination SDT engine that data is available. Next the destination SDT engine then sends a data request to the source SDT engine. The source SDT engine then sends data to the destination SDT engine.

23 Claims, 11 Drawing Sheets

FIG. 7

SYSTEM AND METHOD FOR TRANSFERRING DATA

CROSS-REFERENCE TO RELATED APPLICATIONS

The patent application claims the benefit and priority from U.S. Provisional Patent Application No. 60/389,361 filed on Jun. 17, 2002, which is hereby incorporated by reference in its entirety.

BACKGROUND OF THE INVENTION

1. Field of the Invention

This invention generally relates to a system and method for transferring data between two relatively autonomous processors, one on each side of the data transfer operation.

2. Description of the Related Art

When two nodes on a network need to exchange data over a network, current methods often require that the nodes expose their address spaces to each other. For instance, in a direct memory access ("DMA") operation, the DMA engine needs to know the memory addresses of where to retrieve the data and where to place the data. This presents not only a security problem if a node wants to keep its address space private, but also requires that at least one of the systems have intimate knowledge about the hardware of the other system.

Moreover, transferring data between nodes often requires close synchronization of hardware resources on both ends of the transfer during the data transfer—for instance, between the DMA engine, a hard drive controller and memory. In some cases, the source node often needs to wait for the destination node to be free before the data transfer can begin. Such synchronization permits the nodes to ensure that all the data is transferred in an orderly fashion, but ties up the system while the data transfer is taking place.

Another type of well-know data transfer methodology currently in use today is Internet Protocol ("IP"). This protocol is designed for packet-switched computer communications networks. In this protocol, data is transferred in blocks called "datagrams" from a source to a destination. Each source and destination has an fixed-length address. The datagrams are routed through various processor, such as routers, and each processor would determine where to next send the datagram. There is no hardware synchronization per se.

It would be desirable to overcome these limitations as well as the need for systems/nodes to have intimate knowledge of other systems that they are communicating with in order to transfer data.

BRIEF SUMMARY OF THE INVENTION

The present invention facilitates data movement between two nodes (for example, computer systems, processors, peripherals or communication cards) in a manner consistent with a sockets interface (a well-known inter-processor data movement model). The preferred embodiment of the present invention requires two processors for performing the socket data transfers (the "SDT engines"), one at each edge node that interfaces to the processors. Synchronization must occur between the two SDT engines before a data transfer may occur. Unlike other data transfer methods, such as DMA, which may support two operation types, push and pull, the present invention is optimized to only pull data from a source to a destination.

In the preferred embodiment of the SDT model there is a processor at the data source and a processor at the data destination. Additionally, socket data transfers require a source SDT engine at the source node, and a destination SDT engine at the destination node. An SDT operation consists of data movement from a source SDT engine at one node to a destination SDT engine at another node.

A source SDT engine at one node and a destination SDT engine at another node provides unidirectional data movement from the source to the destination. In order to provide bidirectional data movement, each node must implement both a source SDT engine and a destination SDT engine. However, the present invention does not require bidirectional data movement, and a node is not required to implement both source and destination SDT engines. A node may only need the capability to supply data, and thus would only implement one or more source SDT engines. Conversely, a node may only need to accept data, and would implement one or more destination SDT engines.

To initiate a transfer, the source SDT engine tells the destination SDT engine that data is available. Next the destination SDT engine then sends a data request to the source SDT engine. The source SDT engine then sends data to the destination SDT engine. In contrast to a push model, this pull model eliminates problems with incoming data that the destination SDT engine does not have space for by leaving control with the destination SDT engine.

BRIEF DESCRIPTION OF THE DRAWINGS

The figures below depict various aspects and features of the present invention in accordance with the teachings herein.

DETAILED DESCRIPTION OF THE INVENTION

1. Overview

Figure 1:
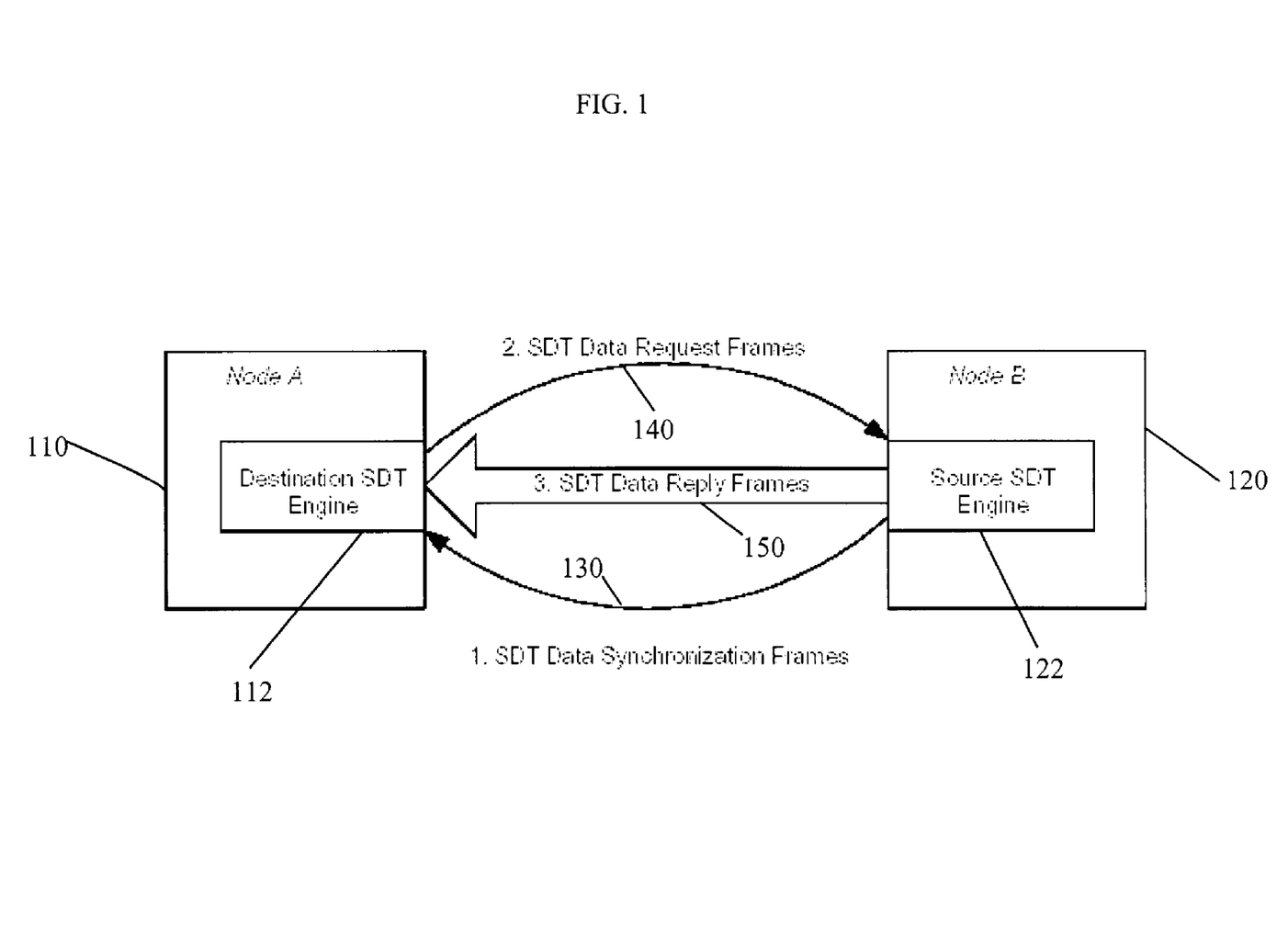
FIG. 1 is a high-level overview of an exemplary embodiment of a system in accordance with one aspect of the invention.

Referring now to FIG. 1, there is shown destination node 110 and source node 120. Associated with destination node 110 is destination SDT engine 112 and with source node 120 is source SDT engine 122.

a. Flow

Also shown in FIG. 1 is a high level overview of the flow data utilizing the present invention. The data transfer protocol of the present invention is as follows:

Step 1: Source SDT engine 122 sends a SDT data synchronization frame 130 to destination SDT engine 112 notifying destination SDT engine 112 that there is data that source SDT engine 122 has to send it.

Step 2: Destination SDT engine 112 sends a SDT data request frame 140 to source SDT engine 122 requesting the data.

Step 3: In response to data request frame 140, source SDT engine 122 sends one or more data reply frames 150, which carries, among other things, the data, to destination SDT engine 112.

Although not shown, data synchronization frame 130, data request frame 140 and data reply frames 150 are transmitted over a network such as Stargen's STARFABRIC™ network, Ethernet or an IP network. The STARFABIC network is described in further detail in co-pending U.S. patent application Ser. No. 10/152,656, hereby incorporated by reference in its entirety.

b. Pipelining

Destination SDT engine 112 may make more than one data request in the data request frame 140 in order to pipeline the data coming from the source SDT engine 122. In this case, after destination SDT engine 112 receives the data from the first data request, it sends an acknowledgement to source SDT engine 122 indicating receipt of the data. Because data request frame 140 contains two data requests, source SDT engine 122 begins sending the data for the second data request immediately. Once received, destination SDT engine 122 sends a second acknowledgement.

In another embodiment, destination SDT engine 112 sends an acknowledgement to source SDT engine 122 but also includes a data request as the same time. This permits better pipelining of commands and information between the nodes thereby reducing communication overhead and enhancing data transfer rates.

c. Hardware

In the preferred embodiment the SDT engines use physically mapped memory addresses. These physical addresses are used to construct descriptor arrays that identify the location of the data blocks that are involved in the data transfer, and are not required to be contiguous. Hardware assumes that all required data and control information is present in physical memory.

With the exception of the node's registers associated with an SDT engine, all other data structures employed by an SDT engine are located in the memory of the local processing sub-system (local memory). Depending on the network, SDT engines may need to compete with their local processing resources for memory resources.

Preferably, SDT source and destination data locations have memory-like characteristics. That is, they can have no addressing side-effects. The only exception is for zerobyte descriptor transfers. Otherwise, byte-masked writes or multiple reads may be performed to create an aligned access for performance or efficiency reasons.

2. Multiple SDT Engines

Figure 2:
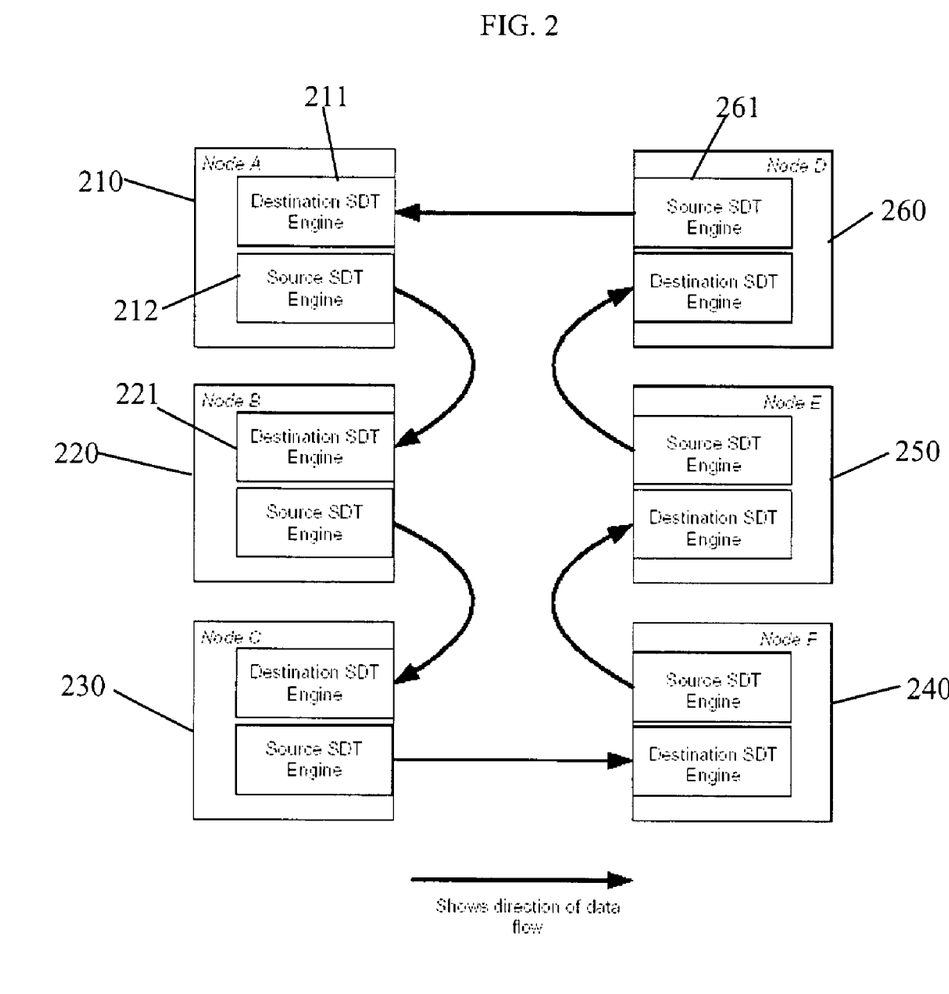
FIG. 2 is a block diagram of one embodiment implementing multiple SDT engines per node.

FIG. 2 shows an example of a system with nodes 210, 220, 230, 240, 250 and 260. Associated with each of these nodes are one or more SDT engines. In this example, a node, such as 210, may also operate as a source of data (source SDT engine 212) with respect to a destination at one (or more) node(s) (example, destination SDT engine 221), and as a destination (destination SDT engine 211) with respect to a source at different node (or nodes) (example, source SDT engine 261). Source and destination SDT engines work independently to create uni-directional connections with different nodes. Although FIG. 2 illustrates a single connection per SDT engine, each SDT engine may also support many simultaneous connections.

In accordance with the present invention, a source SDT engine and a destination SDT engine are functionally independent. Each performs different operations, and has different registers and local memory data structures. If a node implements both a source and a destination SDT engine, in the preferred embodiment they should not share functionality and they should not interact with each other. A node may implement multiple source and destination SDT engines, which again operate independently of each other, have separate registers, and separate data structures.

In the preferred embodiment, the present invention supports one data integrity model, although other data integrity models can be used. For instance, the SDT frames may employ source-to-destination CRC coverage on the data payload of each data reply frame, as well as sequence checking on a series of data reply frames in response to a data request. Another feature is support for re-transmission in the event of a data integrity failure.

3. Data Frames

Figure 3A:
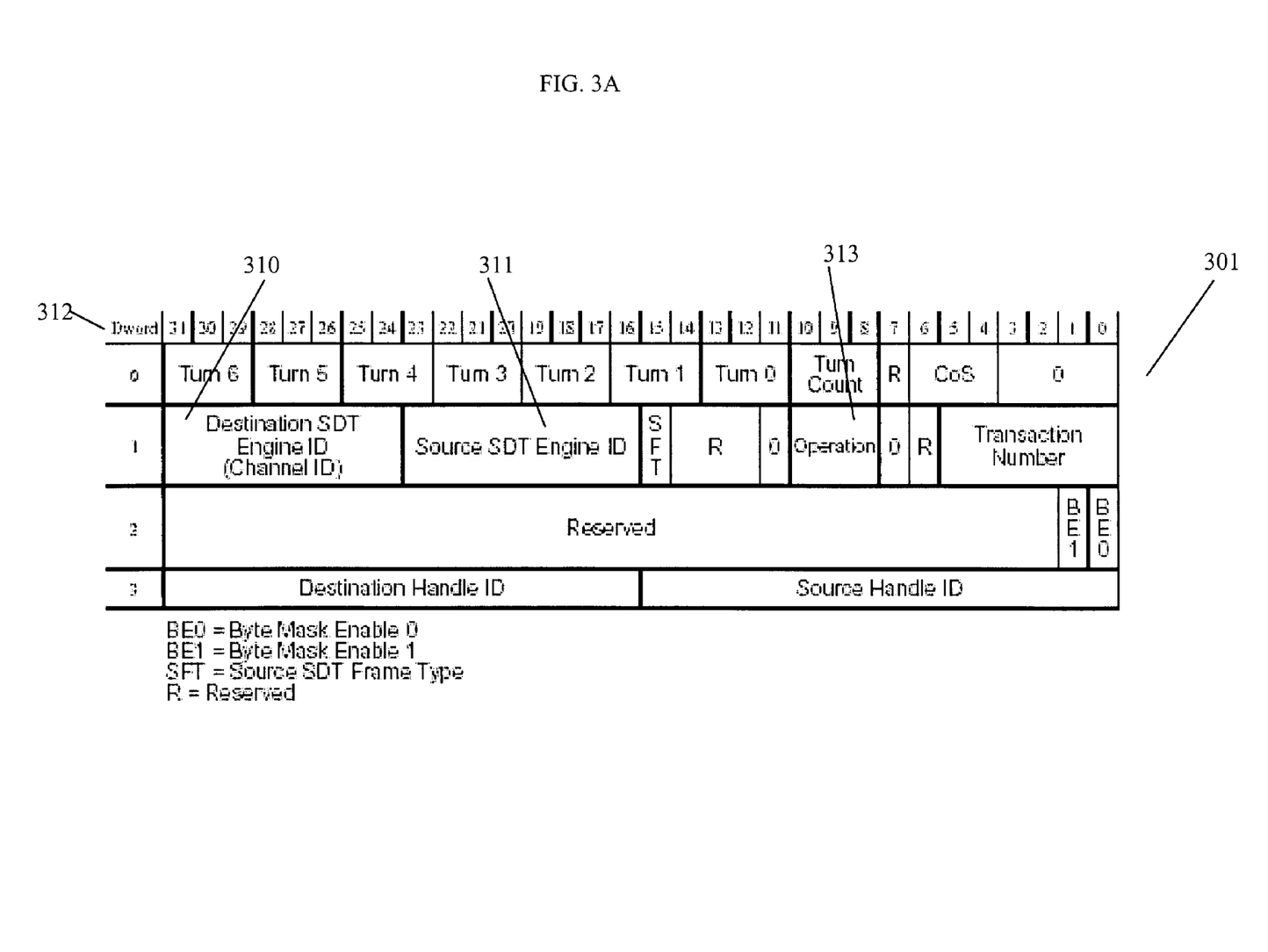
FIGS. 3A-3E shows exemplary frames used by the SDT engines to communicate with one another.

FIGS. 3A-3E shows the preferred embodiment of the data frames used by the present invention using a STARFABRIC network. The frames used by the SDT engines in the preferred embodiment are as follows:

1. Data Notification Frame: Sent by a source SDT engine to a destination SDT engine;
2. Data Notification Error Frame: Sent by a destination SDT engine to a source SDT engine;
3. Data Request Frame: Sent by a destination SDT engine to a source SDT engine;
4. Data Reply Frame: Sent by a source SDT engine to a destination SDT engine and;
5. Data Acknowledge/Request Frame: Sent by a destination SDT engine to a source SDT engine FIG. 3A shows an exemplary data notification frame 301 embodied by the present invention. In particular, the data notification frame is identified by having a destination SDT engine ID 310 and a source SDT engine ID 311. The engine IDs directly or indirectly uniquely identifies the SDT engine to permit other SDT engines to be able to communicate with the specific SDT engine with that ID. The data payload for this frame is always a single dword 312. Operation 313 is set, in this example, to a value indicating a Write operation.

Figure 3B:
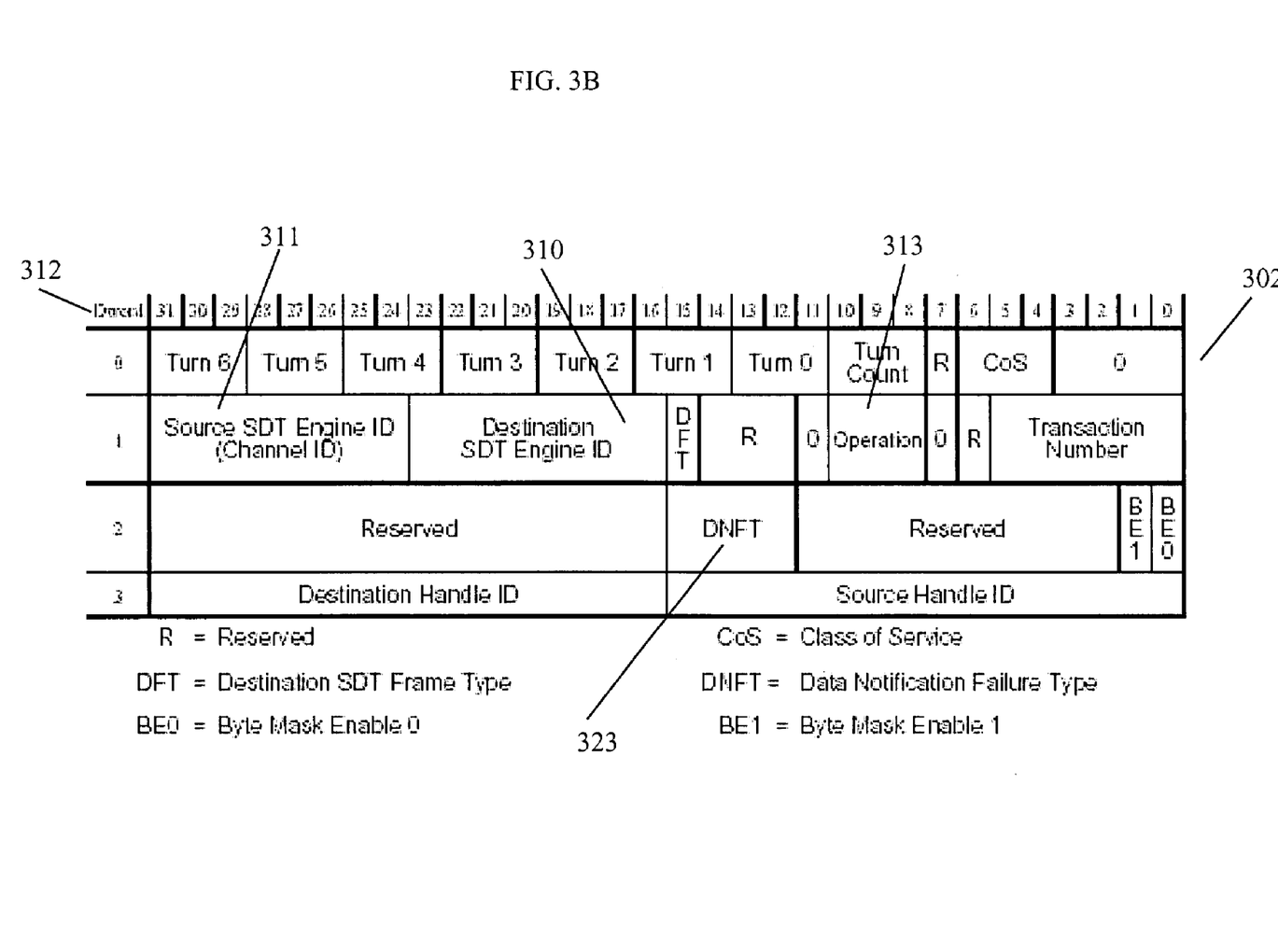

FIG. 3B shows an exemplary data notification error frame 302 embodied by the present invention. The data notification error frame reports data notification processing errors to the source. The frame carries a single-dword data payload 312. It also carries a failure code 323 for the associated data notification. Different failure codes 323 include 0=Normal; 1=Invalid Handle; 2=Protection Error; 3=DataGram Handle Busy; 4=Local Error; 5=Discarded; 6=Engine Stopped; 7-15=Reserved. This type of frame is characterized by having a source SDT engine ID 311, a destination SDT engine ID 310, and an operation 313 of Write.

Figure 3C:
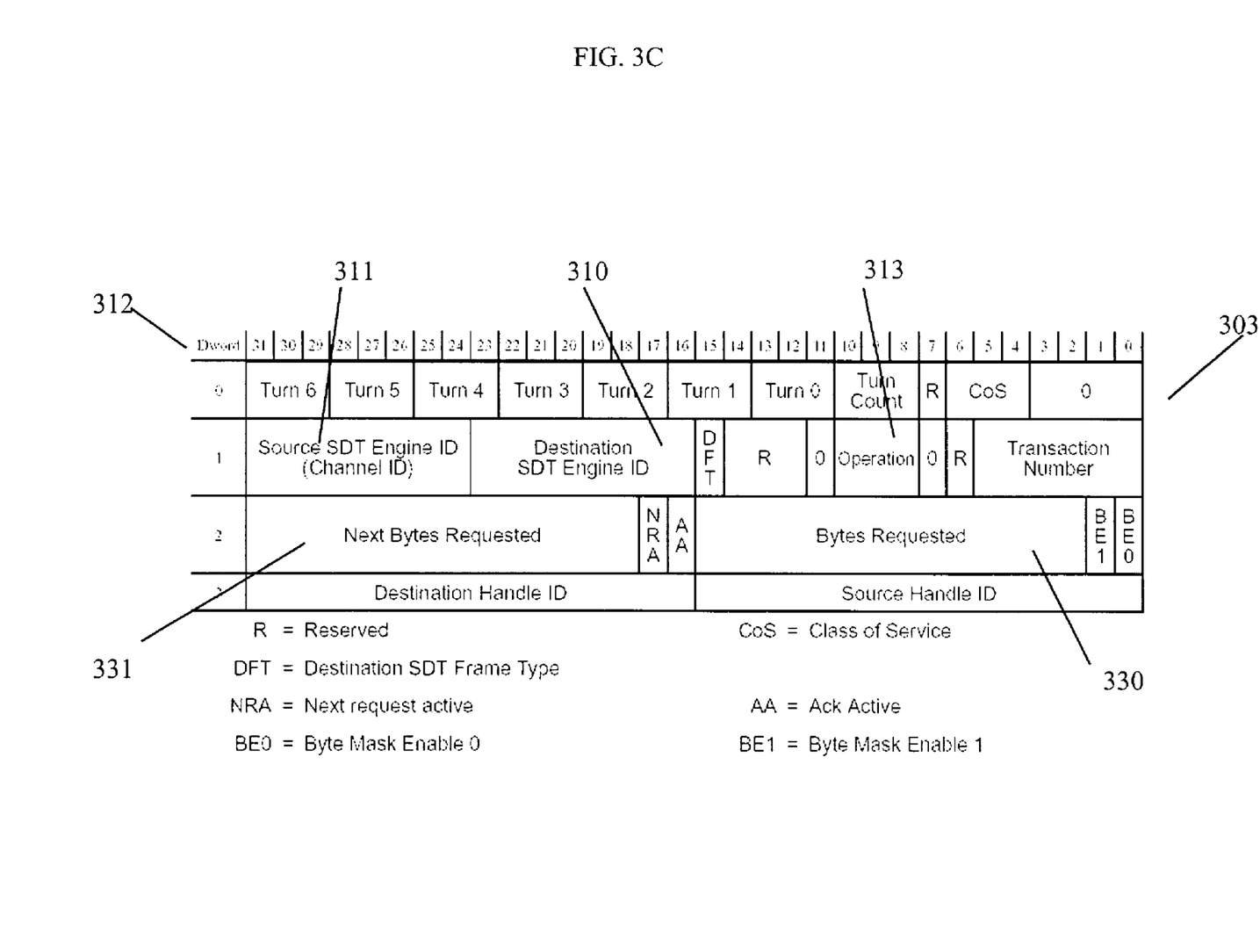

FIG. 3C shows an exemplary data request frame 303 which requests the source to send data. In the preferred embodiment this frame is used for all nonpipelined data requests, or the initial pipelined data request. This type of frame is characterized by having a source SDT engine ID 311, a destination SDT engine ID 310, and an operation 313 of Write. The data payload for this frame is always a single dword 312. This exemplary frame also has a field, bytes requested 330, which contains the number of bytes requested from the source by the destination, where, in the preferred embodiment, a value of 0 means 16 Kbytes are requested (the maximum single request amount for this embodiment, although other data sizes). For pipelined requests, a field, next bytes requested 331, contains the number of bytes requested from the source by the destination for a pipelined request, where, in the preferred embodiment, a value of 0 means 16 Kbytes are requested (the maximum single request amount, although other data sizes may be used).

Figure 3D:
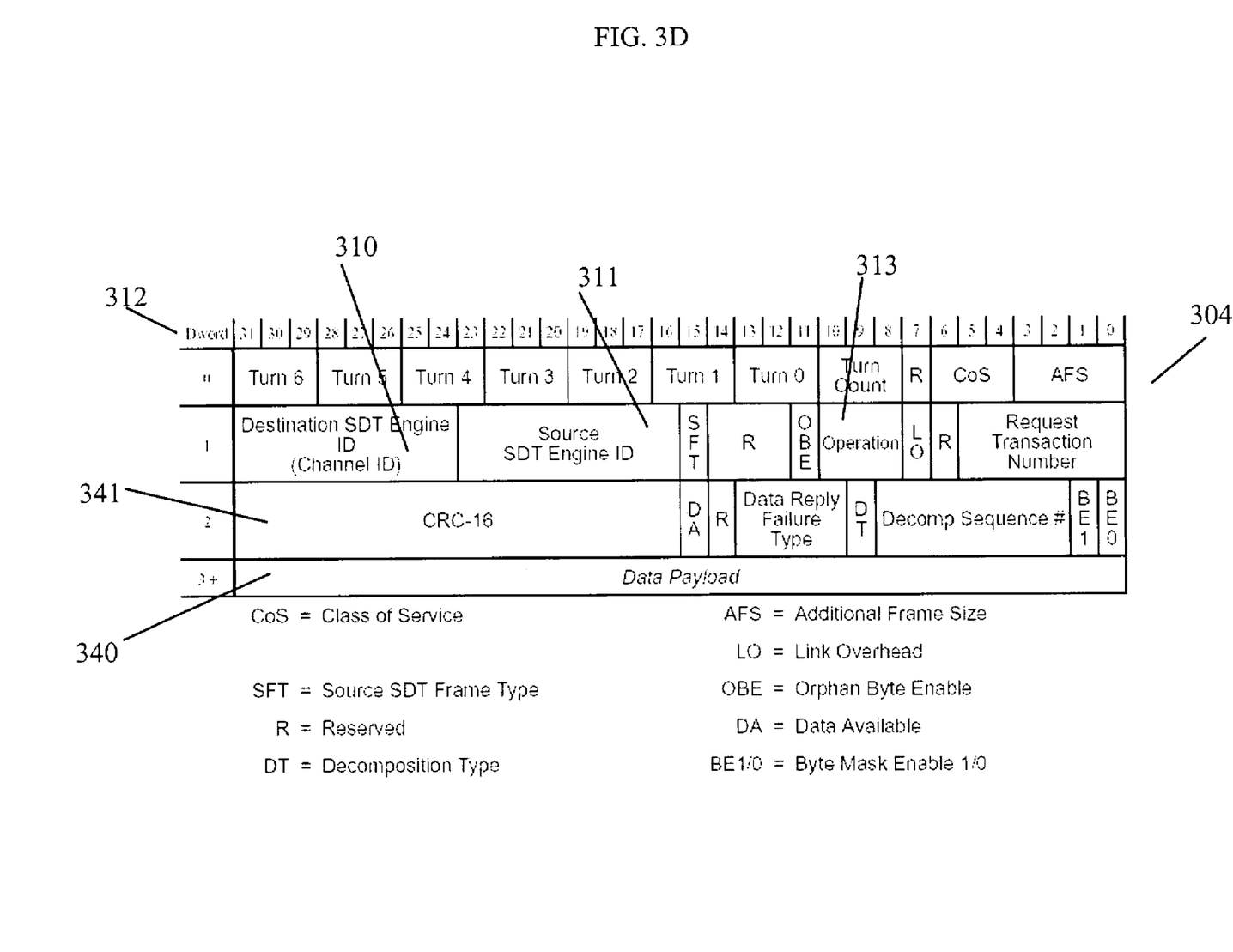

FIG. 3D shows an exemplary data reply frame 304 which carries the data payload for an SDT operation from the source to the destination. This type of frame is characterized by having a source SDT engine ID 311, a destination SDT engine ID 310, and an operation 313 of Write. This exemplary frame also has the data payload 340 and uses a CRC-16 code 341 that covers the data payload of the frame.

Figure 3E:
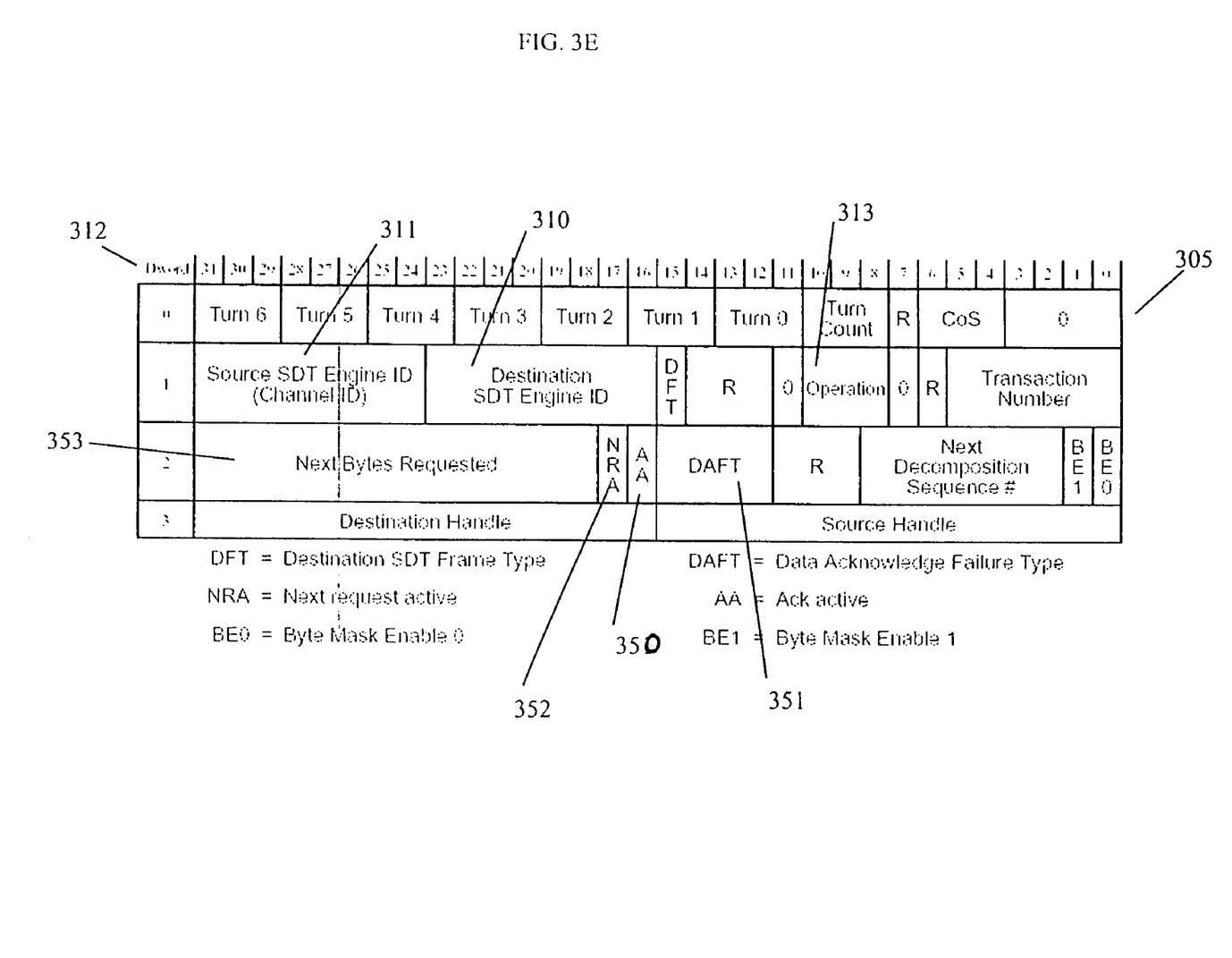

FIG. 3E shows an exemplary data acknowledge frame 305 which is sent by the destination to acknowledge received data, and if a pipelined request, to conditionally request additional data. This type of frame is characterized by having a source SDT engine ID 311, a destination SDT engine ID 310, and an operation 313 of Write. The Ack Active bit 350 is set to a value of 1 to indicate that this data request frame contains an acknowledge; that is, it is not an initial request. It also indicates that the Data Acknowledge Failure Type 351 field is active. The Data Acknowledge Failure Type indicates whether the data transfer was successful at the destination, and a failure code if it was not. The data payload for this frame is always a single dword 312. Other fields in this exemplary embodiment include a Next Request Active 352 field, which is set to a value of 0 to indicate that a pipelined request is not present for this request; that is, there are no other requests for this transaction. The Next Bytes Requested 353 field is set to a value of 0 by the origin and ignored by the terminus. When the Next Request Active 352 field is a 1, this indicates that a pipelined request is present and that the Next Bytes Requested 353 field is active. The Next Bytes Requested 353 field contains the number of bytes requested from the source by the destination for a pipelined request, where a 0 means 16 Kbytes are requested (the maximum single request amount, although other amounts can of course be used).

4. SDT Data Structures

Although the present invention can be implemented in numerous ways, the preferred embodiment of the present invention uses descriptor rings and handle arrays in local memory, and a CSR register interface on the local node. The destination and the source SDT engines each have a set of these structures. Table 1 describes the data structures used by a source SDT engine. Table 2 describes the data structures used by a destination SDT engine.

TABLE 1

| Source Data Structure | Description |
| --- | --- |
| Source Handle Array | Each handle provides information at the source about a connection between a source and a destination. Each handle controls its own descriptor list. The handle indicates whether there is work to be done and the status for that connection. This array is located in local memory at the source. It is initialized and controlled by software, read and updated by the source SDT engine. The Handle Array is indexed by a Handle ID (HID), and is partitioned into four sections, Array 0 through Array 3. These array partitions are not required to be ontiguous in local memory. Array 0 starts with handle index 0, Array 1 starts at handle index 16K (16384), Array 2 starts at handle index 32K (32768), and Array 3 starts at handle index 48K (49152). The maximum number of handles supported is 64K. |
| Source Descriptor Ring | Contains a list of descriptors associated with a handle that provide the local memory address location and the amount of data to be transferred. This ring is located in local memory at the source, and referenced by a handle. The descriptor ring is initialized and written by software and read by the source SDT engine. |
| Source Data | The actual data to be transferred from the source to the destination. Located in the local memory at the source, and referenced by a descriptor. |
| Source SDT Registers | Located in the source SDT engine's node. Written by software to control the state of the SDT engine and to activate the source data available function to process a handle. |

TABLE 2

| Destination Data Structure | Description |
| --- | --- |
| Destination Handle Array | Each handle provides information at the destination about a connection between a source and a destination. Each handle controls its own descriptor list. The handle indicates whether there is work to be done and status for that connection. This array is located in local memory at the destination. It is initialized and controlled by software, read and updated by the destination SDT engine. The Handle Array is indexed by a Handle ID (HID), and is partitioned into four sections, Array 0 through Array 3. These array partitions are not necessarily contiguous in local memory. Array 0 starts with handle index 0, Array 1 starts at handle index 16K (16384), Array 2 starts at handle index 32K (32768), and Array 3 starts at handle index 48K (49152). The maximum number of handles supported is 64K. |
| Destination Descriptor Ring | Contains a list of descriptors associated with a handle that provide the amount of data to be requested, and the local memory address location where data is to be written. This ring is located in local memory at the destination, and referenced by a handle. The descriptor ring is initialized and written by software and read by the destination SDT engine. |
| Destination Data Buffers | The actual data buffer locations to receive data transferred from the source. Located in the local memory at the destination, and referenced by a descriptor. |
| Destination SDT Registers | Located in the destination SDT engine's node. Written by software to control the state of the SDT engine and to activate the destination buffer available function to process a handle. |
| Destination Datagram Ring | Contains information about the source and the amount of data received for a datagram data transfer. Located in local memory at the destination. Written by the destination SDT engine and read by software. |

Figure 4:
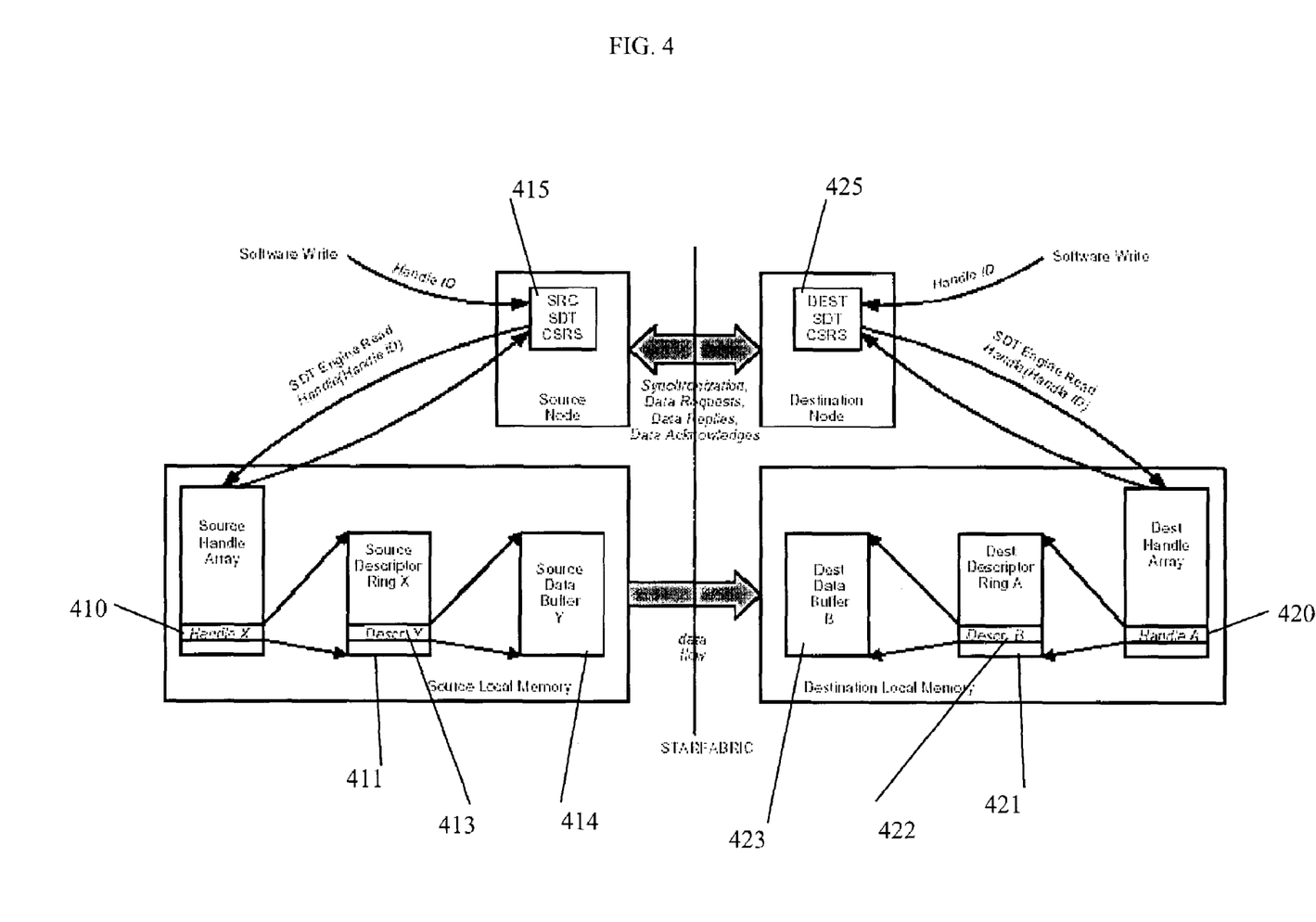
FIG. 4 shows a block diagram of data structures used by the SDT engines in one embodiment of the present invention.

FIG. 4 provides an illustration of how these SDT data structures relate to each other. In this figure, the information for the connection between the source and destination is contained in Handle X (handle 410) at the source and Handle A (handle 420) at the destination. Each handle references a descriptor ring 411 and 421, respectively, used by that connection. Each descriptor in the descriptor ring references a data buffer, which is used for the actual data transfer. In this case, Descriptor Y (descriptor 413) references data buffer 414 and Descriptor B (descriptor 422) references data buffer 423. Software tells the SDT engine to read a particular handle in the handle array. The SDT engine reads the handle to determine whether there is work to do, and if so, the information needed to carry out that work.

FIG. 4 also shows control status registers, registers 415 and 425, for the source SDT engine and destination SDT engine respectively.

5. SDT Functions

The SDT engines of present invention perform a number of functions. The source and the destination SDT engines each have unique functions. Each function performs a different operation on behalf of a handle. Because the processors at the source and destination are autonomous, data can be ready at the source before there is a buffer available at the destination, or the destination might want data before the source has data to return. Thus, synchronization between the source and destination is required before a data transfer can occur. The source data available, destination buffer available, and destination data notification functions provide this synchronization. The source and destination data collector functions handle the data movement between the source and destination. Exemplary functions are as follows:

a. Source Data Available

This function handles the source's side of data synchronization. The source notifies the destination that data is available by sending a data notification frame 301. In the preferred embodiment, software activates this function when data is available (descriptors posted) by writing the Handle ID to the Source Handle Post register.

The source data available function notifies the destination when it has data available to return. Before the destination can send a data request to the source, the source must have notified the destination that data is available (data notification), and the destination must have descriptors posted to receive the data (buffer available). Thus, either the destination buffer available function or the destination data notification function causes a data request to occur, depending on which function is activated last. If both conditions are not satisfied, a data request is not generated. A source SDT engine has one data available function. A destination SDT engine has one buffer available function and one data notification function.

b. Source Data Notification Error

This function receives data notification error frames returned to the source from the destination. This frame indicates that an error has occurred processing the data notification. This function records the appropriate handle status based on the Data Notification Failure Type and dispatches the associated events.

c. Destination Data Synchronization

This function handles the destination's side of data synchronization, and causes a data request frame to be sent to the source. Composed of the Destination Buffer Available function and the Destination Data Notification.

d. Destination Buffer Available

This function causes a data request to be made to the source when descriptors are posted (buffer becomes available) at the destination, if the destination has previously received a data notification from the source. Otherwise a data request is not made. Software activates this function when data is desired (descriptors posted) at the destination by writing the Handle ID to the Destination Handle Post register.

e. Destination Data Notification

This function is activated when the destination is notified that data is available at the source through a data notification frame. If the destination has a buffer available (descriptors posted) to receive the data, the destination sends a data request frame to the source. Otherwise a data request is not made.

f. Source Data Collector

This function handles the source's side of data movement, and is activated when a data request frame targeting the source SDT engine is received from the destination. When the source receives a data request, the source data collector reads the data from local memory and returns it to the destination.

The data collector functions at the source and destination control the actual data transfer once the synchronization between the source and destination occurs. A source or a destination SDT engine may implement multiple data collectors, up to a maximum of 7 in the preferred embodiment. In other embodiments, additional data collector may used if desired. Different source and destination SDT engines are not required to implement the same number of data collectors. The destination data collector initiates a data request, and the source data collector responds.

The handoff to the destination data collector functions for a particular SDT operation occurs when the destination sends a data request to the source. In other words, the destination buffer available or destination data notification function informs a destination data collector function that a data request may be generated. The destination data collector creates a data request, which is handled by the source data collector function. In turn, the data returned by the source is received by the destination data collector function, which may make additional data requests.

g. Destination Data Collector

This function handles the destination's side of data movement, and is activated when a data request frame is sent to the source. The destination data collector writes the data received from the source into local memory and sends a data acknowledge to the source, which may also contain a request for more data. See Source Data Collector, infra, for more information.

6. Pipelining

A socket data transfer relies on a data request—data reply—data acknowledge sequence of frames between the destination and the source to satisfy a request. Pipelined reads make subsequent data requests before the data reply is received for a previous request, which allows the source data collector to spend more of its time collecting data and less time waiting for data acknowledges before proceeding with the next request.

When multiple data requests are required to satisfy a descriptor, it is preferred that the destination use pipelined requests to minimize latency. A single pipelined request may also span multiple descriptors, that is, the destination is not required to end a pipelined request at a descriptor boundary. However, if a pipelined request spans a descriptor boundary, the destination must have the affected descriptors resident within the node in order to determine the proper amount to request and where to write the data when it is received.

Preferably, a source engine should be able to handle a pipelined data request frame. However, the source may choose to return a Data Reply Failure Type of No Data, followed by a data notification frame if it is unable to supply data for the subsequent pipelined request even if descriptors are available. It is preferred that the source data collector be able to satisfy pipelined requests with data.

Figure 5:
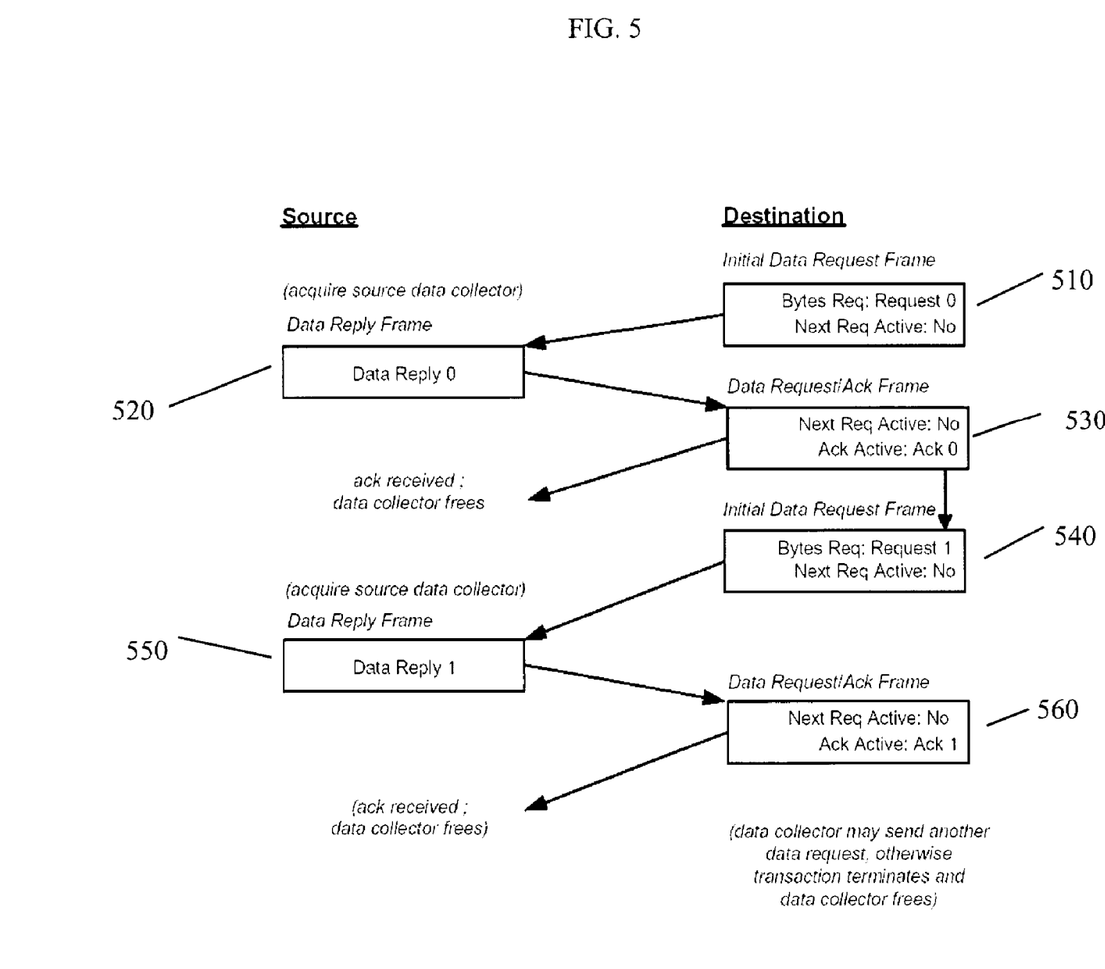
FIG. 5 shows a flow diagram of a non-pipelined request.

FIG. 5 shows the flow for a non-pipelined request consisting of two data requests.

There is only one data request in the frame. An initial non-pipelined request 510 is specified when the Next Bytes Active bit and Ack Active bits are both 0 in an initial data request frame. When a request is not pipelined, the destination must wait until the data reply frame 520 is received and a data acknowledge frame 530 is sent before sending another data request. At the source, once the source satisfies the request and receives an acknowledge, the source data collector is freed.

The next request 540 must acquire the data collector at the source again. The source must be able to properly handle a data acknowledge frame 530 immediately followed by a data request frame 540; this data request is handled as a part of a new source data collection flow (frames 550 and 560).

Once a destination has indicated that it is performing a non-pipelined request in the first data request frame, it must not set the Next Bytes Active in the data acknowledge frame back to the source. However, on a subsequent initial data request frame (Ack Active bit is 0), the destination may pipeline the request. In other words, the destination cannot decide to start pipelining requests in a data acknowledge frame if the associated data request was not pipelined. If the source detects a Next Bytes Active bit in a non-pipelined data acknowledge frame, it may return a data reply frame with a Data Reply Failure Type of Protocol Error and terminate the transaction. Alternatively, the source may ignore the Next Bytes Active bit and simply complete the non-pipelined request. The source does not signal an event. If the destination receives a data reply frame with a Data Reply Failure Type of Protocol Error, it stops the SDT engine, sets the Protocol Error bit in the Destination SDT Raw Status register, and dispatches an Engine Stopped event.

Figure 6:
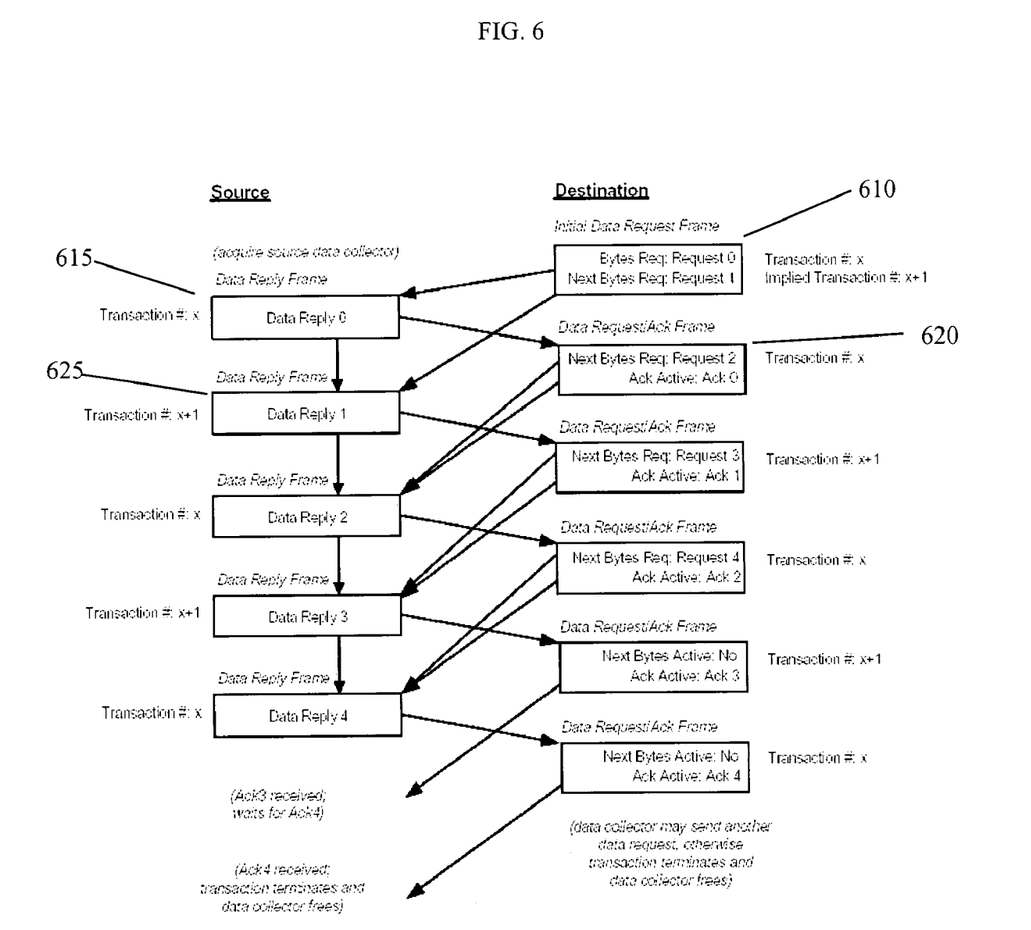
FIG. 6 shows a flow diagram for a pipelined request.

For pipelined data requests, the operations are more complex, but can be combined. FIG. 6 shows and exemplary data flow for a pipelined request. The initial data request frame 610 contains both the first and second data requests, Request 0 and Request 1. An initial pipelined data request frame has a Next Bytes Active bit set to 1 and the Ack Active bit set to 0. Request 0 and Request 1 may each be any size supported by the field. For example, Request 0 could ask for 12 bytes and Request 1 could ask for 4 Kbytes, or vice versa. As soon as the source satisfies the Request 0 it must start working on Request 1 (data reply frame 625). As soon as the destination receives a data reply frame 615 for the Request 0, it returns a data acknowledge frame 620 with the Request 2 and Ack 0, which acknowledges the data sent in response to Request 0 and makes another request. This sequence continues until a data acknowledge frame is received with the Next Bytes Active bit set to a 0, and the Ack Active bit set to a 1. This is a data acknowledge without a next data request, and indicates to the source's data collector that there are no more requests forthcoming as a part of this request pipeline. The source must not combine requests in a pipeline into a single data reply decomposition sequence. The source must respond to each request in a pipeline with a separate data reply decomposition sequence.

7. Datagram SDT

A datagram SDT transaction is non-peer-locked, which means that a given handle at the destination can represent a connection from the destination to different sources at different times. However, a destination handle cannot represent a connection to more than a single source at any one time. Datagram support is required for destination SDT engines. Source SDT engines require no additional functionality to support datagram SDT.

Figure 7:
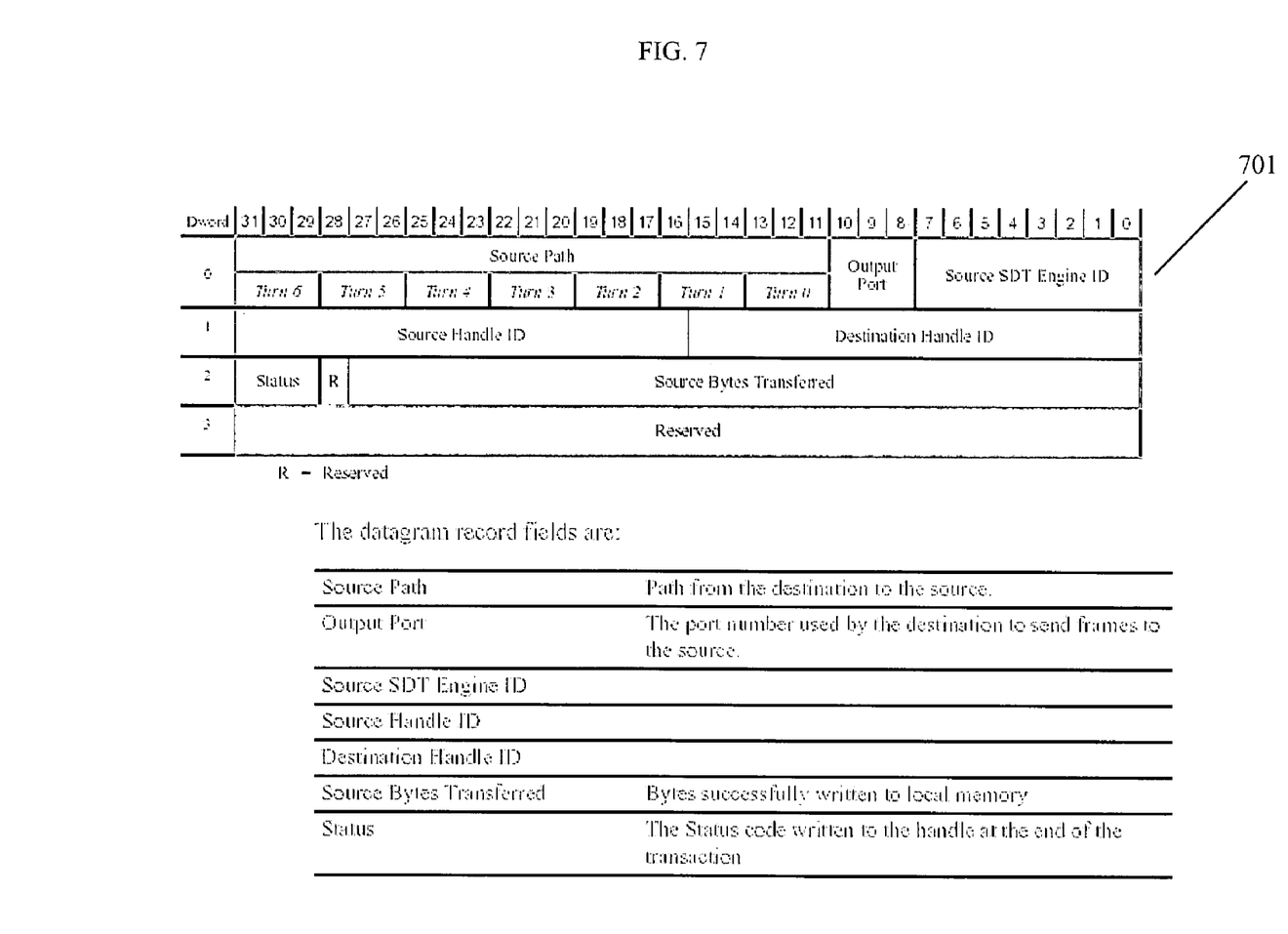
FIG. 7 shows an exemplary datagram frame.

Datagram behavior is enabled when the Peer Lock Flag in the destination's handle is 0. The data notification frame received by the destination identifies the source for that datagram transaction as described in Section 11.5.5.2 of U.S. patent application Ser. No. 60/389,361. When the destination processes the data notification it locks the handle for the duration of the transaction. A locked datagram handle is identified by a Peer Lock Flag of 0 and a Data Available bit of 1. If a subsequent source attempts to lock a handle while it is locked by another source, the destination may either choose to process the data notification at a later time, or may return a data notification error frame to the source with a Data Notification Failure. FIG. 7 illustrates an exemplary datagram frame 701.

8. Example

A detailed example of a system using the present invention is found in U.S. patent application Ser. No. 60/389,361, in particular at Section 11 entitled "Socket Data Transfer" and Section 12 entitled "Frame Formats".

The present invention is implemented in combination of hardware and software. Preferably, the present invention is implemented in one or more computer programs executing on programmable computers that each include a processor, a storage medium readable by the processor (including volatile and non-volatile memory and/or storage elements), at least one input device and one or more output devices. Program code is applied to data entered using the input device to perform the functions described and to generate output information. The output information is applied to one or more output devices.

Each program is preferably implemented in a high level procedural or object oriented programming language to communicate with a computer system, however, the programs can be implemented in assembly or machine language, if desired. In any case, the language may be a compiled or interpreted language.

Each such computer program is preferably stored on a storage medium or device (e.g., CD-ROM, ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner. For illustrative purposes the present invention is embodied in the system configuration, method of operation and product or computer-readable medium, such as floppy disks, conventional hard disks, CD-ROMS, Flash ROMS, nonvolatile ROM, RAM and any other equivalent computer memory device. It will be appreciated that the system, method of operation and product may vary as to the details of its configuration and operation without departing from the basic concepts disclosed herein.

In the manner described above, the present invention thus provides a system and method to transfer data. While this invention has been described with reference to the preferred embodiments, these are illustrative only and not limiting, having been presented by way of example. Other modifications will become apparent to those skilled in the art by study of the specification and drawings. It is thus intended that the following appended claims include such modifications as fall within the spirit and scope of the present invention.

We claim:

1. A system, comprising:
   a first processor, comprising:
      a first socket interface configured to communicate with a second socket interface of a second processor over a computer network, wherein the first socket interface includes a plurality of registers and is configured to:
      transmit a data synchronization frame to the second socket interface, wherein the data synchronization frame includes a first transaction identifier and wherein the data synchronization frame indicates that a first set of data is available for transmission from the first socket interface to the second socket interface, wherein the first transaction identifier is usable by the first socket interface to determine a physical memory address of the first set of data within a first address space accessible to the first socket interface;

receive a data request frame from the second socket interface, wherein the data request frame includes the first transaction identifier and a second transaction identifier, wherein the data request frame indicates that the second processor has storage space to accept transmission of the first set of data, wherein the second transaction identifier is usable by the second socket interface to determine a physical memory address of a storage location for the first set of data within a second address space accessible to the second socket interface, wherein the second address space is distinct from the first address space;

in response to receiving the data request frame, use the first transaction identifier to retrieve the first set of data from the first address space;

transmit a data reply frame to the second socket interface in response to the data request frame, wherein the data reply frame includes the second transaction identifier and at least a portion of the first set of data.

2. The system of claim 1, further comprising the second processor.

3. The system of claim 2, wherein the computer network comprises an Ethernet network.

4. The system of claim 2, wherein the computer an IP network.

5. The system of claim 1, wherein the first socket interface is further configured to store a plurality of transaction identifiers and a plurality of physical memory addresses in the first address space, wherein each stored transaction identifier is usable by the first socket interface to determine a respective one of the stored plurality of physical memory addresses.

6. The system of claim 1, wherein the plurality of registers in the first socket interface includes a first register configured to store a transaction identifier.

7. The system of claim 1, wherein the data request frame further indicates that the second processor has storage space to accept transmission of a second set of data from the first socket interface, wherein the data request frame further includes a third transaction identifier usable by the first socket interface to determine a physical memory address of the second set of data within the first address space.

8. The system of claim 1, wherein the first processor further includes a third socket interface configured to:

receive a second data synchronization frame from a fourth socket interface of the second processor, wherein the second data synchronization frame includes a third transaction identifier, wherein the third transaction identifier is usable by the fourth socket interface to determine a physical memory address of a second set of data within the second address space, wherein the second address space is accessible to the fourth socket interface;

transmit a second data request frame to the fourth socket interface, wherein the second data request frame includes the third transaction identifier and a fourth transaction identifier, wherein the fourth transaction identifier is usable by the third socket interface to determine a physical memory address of a storage location for the second set of data within the first address space, wherein the first address space is accessible to the third socket interface;

receive a second data reply frame from the fourth socket interface in response to the second data request frame, wherein the second data reply frame includes the fourth transaction identifier and at least a portion of the second set of data.

9. The system of claim 1, wherein the first and second socket interfaces are not configured to transmit data from the second socket interface to the first socket interface for storage in the first address space.

10. A method for transferring data between peer processors, the method comprising:

a first socket interface of a first processor sending a data synchronization frame over a computer network to a second socket interface of a second processor, wherein the data synchronization frame includes a first transaction identifier and wherein the data synchronization frame indicates that a first set of data is available for transmission from the first socket interface to the second socket interface, wherein the first transaction identifier is usable by the first socket interface to determine a memory address of the first set of data within a first address space accessible to the first socket interface;

the first socket interface receiving a data request frame from the second socket interface over the computer network, wherein the data request frame includes the first transaction identifier and a second transaction identifier, wherein the data request frame indicates that the second processor has storage space to accept transmission of the first set of data, wherein the second transaction identifier is usable by the second socket interface to determine a physical memory address of a storage location for the first set of data within a second address space accessible to the second socket interface, wherein the second address space is distinct from the first address space;

in response to receiving the data request frame, the first socket interface using the first transaction identifier to retrieve the first set of data from the first address space; and the first socket interface transmitting a data reply frame to second socket interface in response to the data request frame, wherein the data reply frame includes the second transaction identifier and at least a portion of the first set of data.

11. The method of claim 10, wherein the computer network includes an IP network.

12. The method of claim 10, further comprising the first socket interface storing a plurality of transaction identifiers and a plurality of physical memory addresses in the first address space, wherein each transaction identifier in the stored plurality of transaction identifiers is usable by the first socket interface to determine a respective one of the plurality of physical memory addresses.

13. The method of claim 10, further comprising the first socket interface storing the first transaction identifier to one of a plurality of registers within the first socket interface.

14. The method of claim 10, wherein the data request frame further indicates that the second processor has storage space to accept transmission of a second set of data from the first socket interface, wherein the data request frame further includes a third transaction identifier usable by the first socket interface to determine a physical memory address of the second set of data within the first address space.

15. The method of claim 10, further comprising:

a third socket interface of the first processor receiving a second data synchronization frame from a fourth socket interface of the second processor, wherein the second data synchronization frame includes a third transaction identifier, wherein the third transaction identifier is usable by the fourth socket interface to determine a physical memory address of a second set of data within the second address space accessible to the fourth socket interface;

the third socket interface transmitting a second data request frame to the fourth socket interface, wherein the second data request frame includes the third transaction identifier and a fourth transaction identifier, wherein the fourth transaction identifier is usable by the third socket interface to determine a physical memory address of a storage location for the second set of data within the first address space accessible to the third socket interface;

the third socket interface receiving a second data reply frame from the fourth socket interface in response to the second data request frame, wherein the second data reply frame includes at least a portion of the second set of data and the fourth transaction identifier.

16. The method of claim 10, wherein the first and second socket interfaces are not configured to transmit data from the second socket interface to the first socket interface for storage in the first address space.

17. An article of manufacture including a computer-readable medium having instructions stored thereon that, if executed by a first processor, cause the first processor to perform a method comprising:

a first socket interface of the first processor sending a data synchronization frame to a second socket interface of a second processor, wherein the data synchronization frame includes a first transaction identifier and wherein the data synchronization frame indicates that a first set of data is available for transmission from the first socket interface to the second socket interface over a computer network, wherein the first transaction identifier is usable by the first socket interface to determine a physical memory address of the first set of data within a first address space accessible to the first socket interface;

the first socket interface receiving a data request frame from the second socket interface, wherein the data request frame includes the first transaction identifier and a second transaction identifier, wherein the data request frame indicates that the second socket interface has storage space to accept transmission of the first set of data, wherein the second transaction identifier is usable by the second socket interface to determine a physical memory address of a storage location for the first set of data within a second address space accessible to the second socket interface, wherein the second address space is distinct from the first address space;

in response to receiving the data request frame, the first socket interface using the first transaction identifier to retrieve the first set of data from the first address space; and the first socket interface transmitting a data reply frame to second socket interface in response to the data request frame, wherein the data reply frame includes the second transaction identifier and at least a portion of the first set of data.

18. The article of manufacture of claim 17, wherein the method further comprises the first socket interface storing a plurality of transaction identifiers and a plurality of physical memory addresses in the first address space, wherein each stored transaction identifier is usable by the first socket interface to determine a respective one of the plurality of physical memory addresses.

19. The article of manufacture of claim 17, wherein the data request frame further indicates that the second socket interface has storage space to accept transmission of a second set of data, wherein the data request frame further includes a third transaction identifier usable by the first socket interface to determine a physical memory address of the second set of data within the first address space.

20. The article of manufacture of claim 17, wherein the method further comprises:

a third socket interface of the first processor receiving a second data synchronization frame from a fourth socket interface of the second processor, wherein the second data synchronization frame includes a third transaction identifier, wherein the third transaction identifier is usable by the fourth socket interface to determine a physical memory address of a second set of data within the second address space accessible to the fourth socket interface;

the third socket interface transmitting a second data request frame to the fourth socket interface, wherein the second data request frame includes the third transaction identifier and a fourth transaction identifier, wherein the fourth transaction identifier is usable by the third socket interface to determine a physical memory address of a storage location for the second set of data within the first address space accessible to the third socket interface;

the third socket interface receiving a second data reply frame from the fourth socket interface in response to the second data request frame, wherein the second data reply frame includes at least a portion of the second set of data and the fourth transaction identifier.

21. The article of manufacture of claim 17, wherein the first socket interface is configured to communicate with the second socket interface via an Ethernet network.

22. The article of manufacture of claim 17, the first socket interface is configured to communicate with the second socket interface via an IP network.

23. The article of manufacture of claim 17, wherein the first and second socket interfaces are not configured to transmit data from the second socket interface to the first socket interface for storage in the first address space.

* * * * *

UNITED STATES PATENT AND TRADEMARK OFFICE
CERTIFICATE OF CORRECTION

PATENT NO. : 7,631,313 B2
APPLICATION NO. : 10/464027
DATED : December 8, 2009
INVENTOR(S) : Mayhew et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 811 days.

Signed and Sealed this

Twenty-first Day of December, 2010

David J. Kappos
*Director of the United States Patent and Trademark Office*